June 10, 1958     H. E. BALSIGER ET AL     2,838,040
DRESSER FOR MULTIPLE GRINDING WHEELS
Filed April 30, 1956     3 Sheets-Sheet 1

INVENTOR
HAROLD E. BALSIGER
BY CHARLES E. TOLBERT
ATTORNEY

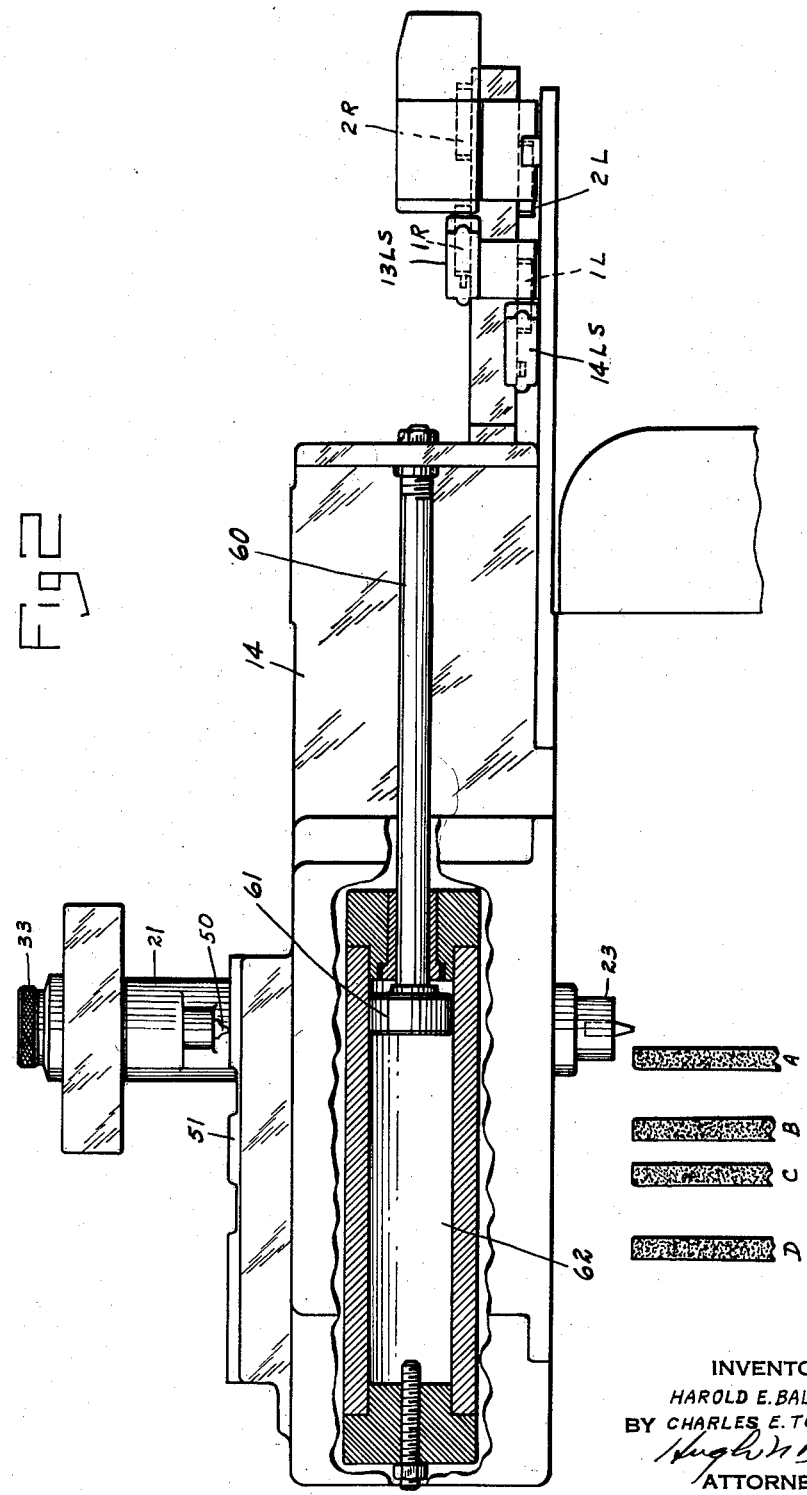

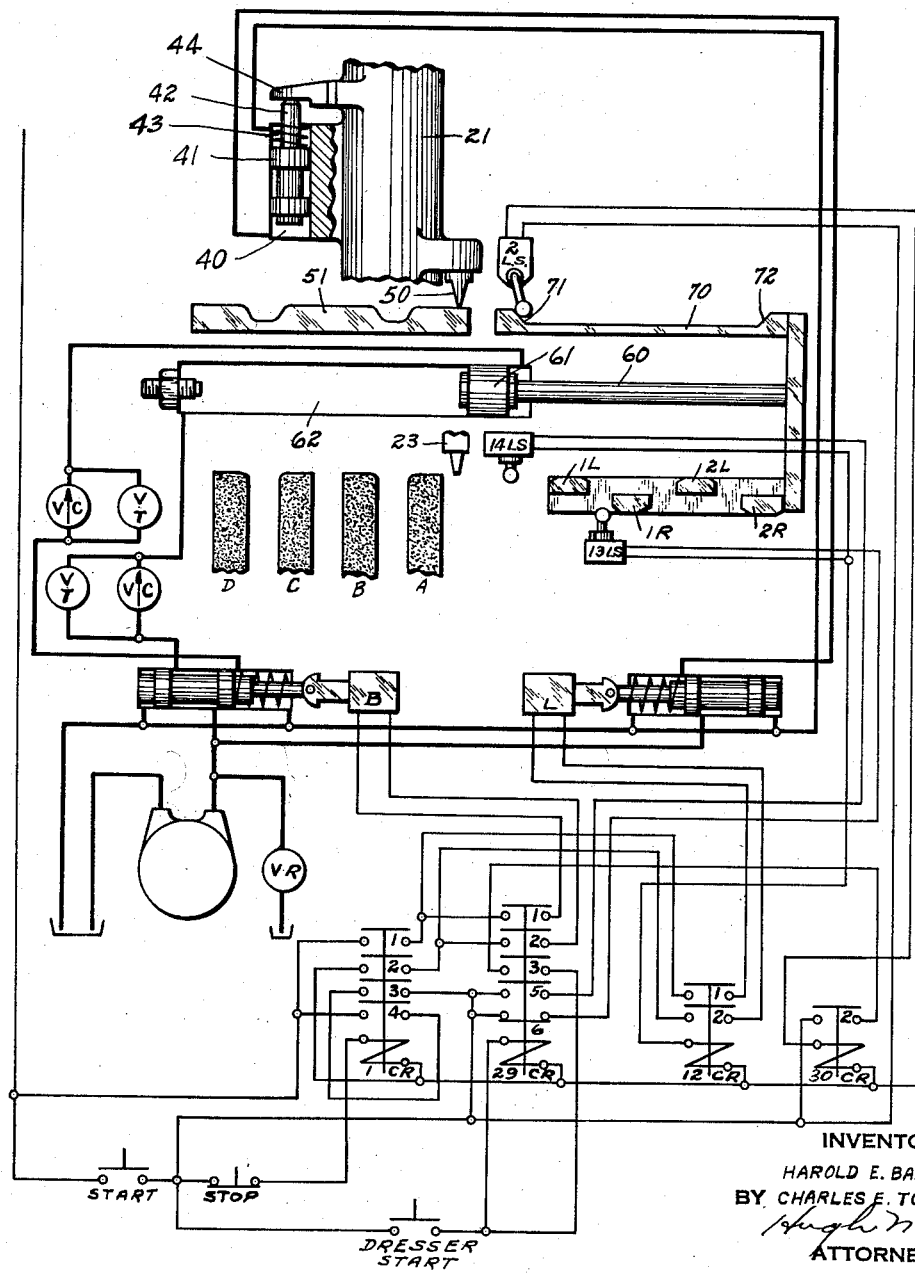

United States Patent Office 2,838,040
Patented June 10, 1958

2,838,040

DRESSER FOR MULTIPLE GRINDING WHEELS

Harold E. Balsiger and Charles E. Tolbert, Waynesboro, Pa., assignors to Landis Tool Company, Waynesboro, Pa.

Application April 30, 1956, Serial No. 581,576

10 Claims. (Cl. 125—11)

This invention relates to dressing devices for multiple wheel grinders particularly where the wheels are so formed that special control of the dressing tool is required.

Where a templet and follower are used to guide a dressing tool, provisions must be made for certain limitations in such apparatus; for example, there is a limit to the angle of inclination which can be traversed upwardly by a templet follower. The conventional solution to this problem is to apply the dressing tool to the wheel only during traverse in the direction where the follower and dresser move downwardly on the inclined or curved surface.

The problem for which the present invention provides a solution is based on such apparatus applied to multiple spaced wheels so formed that the dressing tool is applied only to alternate wheels in each direction of traverse.

It is therefore an object of this invention to provide means whereby a dressing tool will dress certain selected wheels as it traverses in one direction and will dress certain other selected wheels when it traverses in the opposite direction.

While this invention relates to dressing mechanisms, its application is not limited to a dressing operation. Obviously, it may be applied to a machining operation other than that of dressing grinding wheels, particularly where it is desirable to machine selected portions of a workpiece in a predetermined sequence.

It is therefore another object of this invention to provide means for performing an operation on selected axially aligned articles or portions of an article to be operated on in a predetermined sequence.

Figure 2 is an end elevation showing the relative position of the dressing tool and the limit switches for controlling the operation of said tool.

Figure 3 is a diagram of the hydraulic and electric circuits.

Figure 1:
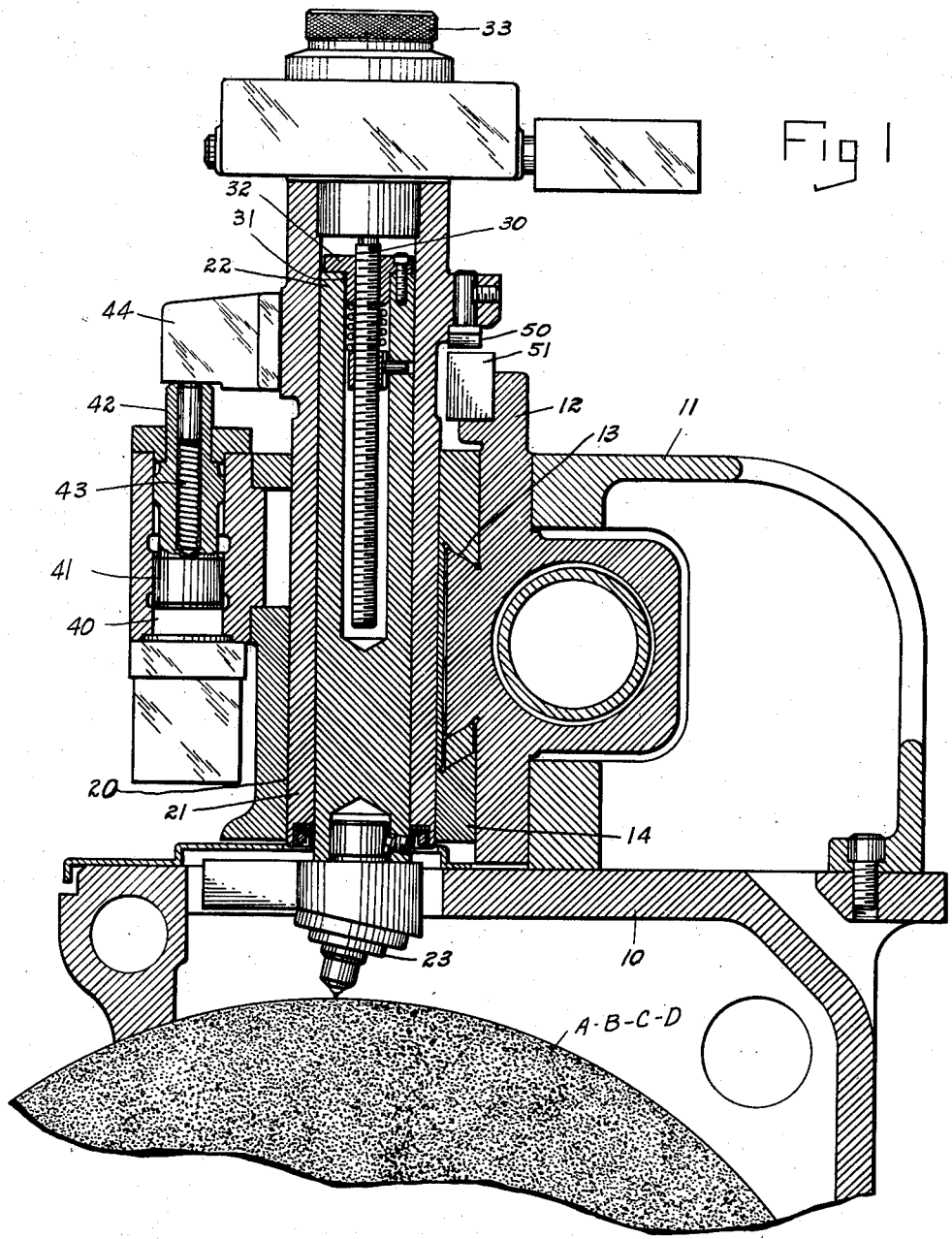
Figure 1 is a sectional front elevation of a dressing tool showing the method of mounting said tool for traverse movement, adjustment, control by templet, and means for moving said dressing tool and templet to operative position.

Numeral 10 indicates a wheelbase in which are rotatably mounted four wheels A, B, C, and D. A bracket 11 is attached to the top of said wheelbase 10 and attached to said bracket 11 is a base member 12 for a dressing mechanism. Said member 12 has formed thereon one part of a dove tail guide 13, the mating part of said guide is formed on a dresser carriage 14. Said carriage has a bore 20 in which a tubular member 21 is slidably supported. A diamond tool holder 22 having a dressing tool 23 at the lower end thereof is slidably supported in member 21.

Provision for effecting adjustment of tool 23 consists of a screw 30 in bore 31 in holder 22. Said screw is threaded through a cap member 32 attached to the upper end of said tool holder 22. Said screw may be turned by a knob 33.

A cylinder 40 is mounted on the front end of carriage 14 and contains a piston 41. A hollow piston rod 42 extends through the upper part of said cylinder 40 to engage an abutment 44 on member 21. On the opposite side of member 21 is a follower 50 held by gravity in contact with templet 51 in base member 12. When fluid under pressure is introduced into the lower end of cylinder 40, piston 41 through rod 42 raises abutment 44 to separate the follower, templet, dressing tool 23 and one of said grinding wheels.

As shown in Figure 2, carriage 14 is connected to a piston rod 60 on piston 61 in traverse cylinder 62. Also connected to said piston rod is a cam member 70 as shown in Figure 3 having longitudinally spaced portions 71 and 72 corresponding to the ends of the dresser traverse. Said cam actuates 2LS which controls the reversing means for piston 61 and carriage 14. A pair of cams 1L and 2L for actuating 14LS and another pair of cams 1R and 2R for actuating 13LS are connected to piston rod 60. 13LS and 14LS are operable alternately; 13LS when the carriage moves from left to right and 14LS when said carriage moves from right to left.

Operation

1CR is energized by closing the machine start switch. 1CR-3 and 1CR-4 provide a holding circuit for 1CR. 1CR-3 also closes a circuit to 29CR-6 which is normally closed and 29CR-5 which is normally open. The machine start switch also completes a circuit through 2LS which is closed by portion 71 of cam 70 in the position shown in Figure 3, and energizes 30CR.

In order to start the dressing operation, the dresser start switch is closed to energize 29CR. 30CR-2 provides a holding circuit for 29CR through 29CR-3. 29CR-1 and 29CR-2 energize valve solenoid B to shift the valve to the right and direct fluid under pressure from the pump to the right hand end of the traverse cylinder 62. The traverse piston 61 moves the carriage 14 to the left and the dresser engages wheel A guided by the follower 50 and the templet 51 to produce a radius on the left corner of said wheel. As the carriage 14 movement to the left continues and the dressing tool 23 moves toward wheel B, the first cam 1L engages 14LS to energize 12CR. 12CR-1 and 12CR-2 energize valve solenoid L, shifting the valve to the left and directing fluid under pressure to the lower end of the diamond lift cylinder 40 to remove the follower 50 from the templet 51 and the dressing tool 23 from position to engage wheel B. As movement to the left continues, 14LS is released by cam 1L and solenoid L is deenergized to permit the resetting of the valve to connect the lower end of the diamond lift cylinder 40 with exhaust; thus, permitting the follower 50 to return to engagement with the templet and position the diamond to engage wheel C. Piston 41 is reset by spring 43. The preceding functions are repeated as the diamond is moved across wheels C and D. After the passage across wheel D, limit switch 2LS is actuated by the reversing cam portion 72 to open the circuit to 30CR.

30CR-2 opens the holding circuit to 29CR. 29CR deenergizes, opening contacts 1, 2, 3 and 5 and closing contact 6. Opening 29CR-1 and 29CR-2 deenergizes traverse solenoid valve B permitting the valve spring to reset the valve and reverse the traverse movement to the right. When 13LS is engaged by cam 1R, it completes a circuit through normally closed 29CR-6 to energize 12CR. 12CR-1 and 12CR-2 energize diamond lift valve solenoid L to lift the diamond to skip wheel C as the diamond moves to the right. The diamond is returned to dress wheel B and retracted by cam 2R to skip wheel A. When the carriage reaches the end of its stroke, 2LS is closed energizing 30CR and closing 30CR-2 so that the next time that 29CR is energized, the holding circuit will be provided through 29CR-3. The carriage 14 stops in this position and will remain at rest until 29CR is again energized by closing the dresser start switch.

2LS and 30CR, by alternately energizing and deenergizing 29CR, determine whether 12CR and lift valve solenoid L will be energized by 13LS or 14LS.

We claim:

1. A dressing device for a plurality of formed grinding wheels including a base member, a carriage slidably mounted on said base member, a diamond holder slidably mounted on said carriage for movement transversely of said carriage, a templet, a follower on said diamond holder for engaging said templet, means for effecting engagement between said follower and certain portions of said templet when said carriage is moving in one direction, and power means including a hydraulic motor for separating said follower from said portions of said templet when said carriage is moving in the other direction.

2. A dressing device for a plurality of formed grinding wheels including a base member, a carriage slidably mounted on said base member, a diamond holder slidably mounted on said carriage for movement transversely of said carriage, a templet, a follower on said diamond holder for engaging said templet, means for effecting a traversing movement between said diamond holder and said wheels, power means including a hydraulic motor for retracting said diamond holder after dressing one wheel, to by-pass the next wheel.

3. A dressing device for a plurality of formed grinding wheels including a base member, a carriage slidably mounted on said base member, a diamond holder slidably mounted on said carriage for movement transversely of said carriage, a templet, a follower on said diamond holder for engaging said templet, means for effecting a traversing movement between said diamond holder and said wheels, power means including a hydraulic motor for retracting said diamond holder after dressing one wheel, to by-pass the next wheel, and means to return said diamond holder to operating position to dress a third wheel.

4. A dressing device for formed grinding wheels comprising a base member, a carriage slidably mounted on said base member, a diamond holder slidably mounted on said carriage for movement transversely of said carriage, a templet, a follower on said diamond holder for engaging said templet, means for effecting said transverse movement of said diamond holder comprising a hydraulic motor, a solenoid valve for supplying fluid under pressure to said motor, a switch for actuating said solenoid valve, a cam on said carriage for actuating said switch when said carriage is moving in one direction, and means to render said switch ineffective during movement of said carriage in the opposite direction.

5. A dressing device for formed wheels comprising a base member, a carriage slidably mounted on said base member, means for moving said carriage alternately in opposite directions, a diamond holder slidably mounted on said carriage for movement transversely of said carriage, a template, a follower on said diamond holder for engaging said template, means for effecting said transverse movement of said diamond holder and follower comprising a hydraulic motor, a solenoid valve for directing fluid under pressure to said hydraulic motor, a switch for actuating said solenoid valve, a cam on said carriage for actuating said switch when said carriage is moving in one direction, and means to render said switch ineffective during movement of said carriage in the opposite direction.

6. A dressing device for formed grinding wheels comprising a base member, a carriage slidably mounted on said base member, means for moving said carriage alternately in opposite directions, a diamond holder slidably mounted on said carriage for movement transversely of said carriage, means for effecting said transverse movement of said diamond holder comprising a hydraulic motor, a solenoid valve for directing fluid under pressure to said motor, a switch for actuating said solenoid valve, a cam on said carriage for actuating said switch when said carriage is moving in one direction, and means to render said switch ineffective during movement of said carriage in the opposite direction.

7. A dressing device for formed grinding wheels comprising a base member, a carriage slidably mounted on said base member, means for moving said carriage alternately in opposite directions, a diamond holder slidably mounted on said carriage for movement transversely of said carriage, means for effecting said transverse movement of said diamond holder comprising a hydraulic motor, a solenoid valve for directing fluid under pressure to said motor, a switch for actuating said solenoid valve, a cam on said carriage for actuating said switch when said carriage is moving in one direction, and means including a control device operable at one end of said carriage movement to render said switch ineffective during movement of said carriage in the opposite direction.

8. In a machine tool, a tool support, a work support, means to effect relative transverse and longitudinal movements between said supports, means to cause said tool to selectively engage one or more workpieces or portions of a workpiece during said longitudinal movement in one direction and to engage one or more other workpieces during said longitudinal movement in the opposite direction while omitting said first mentioned workpiece including a relay having a normally open and a normally closed contact for controlling the application of said tool to said work in each direction of traverse, and a switch operable at each end of said longitudinal movement for energizing or deenergizing said relay.

9. In a machine tool, a tool support, a work support, means to effect relative transverse and longitudinal movements between said supports, means to cause said tool to selectively engage one or more workpieces or portions of a workpiece during said longitudinal movement in one direction and to engage one or more other workpieces during said longitudinal movement in the opposite direction while omitting said first mentioned workpiece including means operable at each end of said longitudinal movement to determine which workpiece shall be engaged and which one omitted during the next longitudinal movement.

10. In a machine tool, a tool support, a work support, means to effect relative transverse and longitudinal movements between said supports, means to effect said longitudinal movement intermittently to submit axially spaced workpieces or portions of a workpiece to a machining operation including spaced cams on said longitudinal moving support corresponding to some of said portions, a limit switch in the path of said cams, other spaced cams on said support corresponding to other portions, a second limit switch in the path of said other cams, and a third switch operable during said longitudinal movement in one direction for rendering one of said first two switches effective and the other ineffective.

References Cited in the file of this patent

UNITED STATES PATENTS

| 1,677,131 | Cole | July 17, 1928 |
| 2,229,016 | Olson | Jan. 14, 1941 |
| 2,693,125 | Von Zelewsky | Nov. 2, 1954 |